United States Patent [19]
Miyamoto et al.

[11] Patent Number: 6,120,590
[45] Date of Patent: Sep. 19, 2000

[54] WATER-BASE INK HAVING METALLIC LUSTROUS COLOR FOR BALLPOINT PEN

[75] Inventors: Masaru Miyamoto; Kiyoshi Iwamoto, both of Yokohama, Japan

[73] Assignee: Mitsubishi Pencil Kabushiki Kaisha, Tokyo, Japan

[21] Appl. No.: 09/319,797

[22] PCT Filed: Oct. 17, 1997

[86] PCT No.: PCT/JP97/03748

§ 371 Date: Jul. 9, 1999

§ 102(e) Date: Jul. 9, 1999

[87] PCT Pub. No.: WO98/26014

PCT Pub. Date: Jun. 18, 1998

[30] Foreign Application Priority Data

Dec. 12, 1996 [JP] Japan ................................. 8-332490
Jan. 27, 1997 [JP] Japan ................................. 9-012770
Jan. 30, 1997 [JP] Japan ................................. 9-017093

[51] Int. Cl.$^7$ ................................................. C09D 11/02
[52] U.S. Cl. ................. 106/31.6; 106/31.65; 106/31.68; 106/31.7; 106/31.75; 106/31.77; 106/31.86; 106/31.95
[58] Field of Search ................................ 106/31.6, 31.65, 106/31.68, 31.7, 31.85, 31.75, 31.77, 31.95

[56] References Cited

U.S. PATENT DOCUMENTS

| | | | |
|---|---|---|---|
| 4,604,139 | 8/1986 | Shioi et al. | 106/31.6 |
| 5,474,603 | 12/1995 | Miyashita et al. | 106/31.7 |
| 5,944,886 | 8/1999 | Hashizume | 106/404 |

FOREIGN PATENT DOCUMENTS 1-210478 of 0000 Japan.
1-56109 of 0000 Japan.
2-57102 of 0000 Japan.
2-69580 of 0000 Japan.
3-157466 of 0000 Japan.
3-157467 of 0000 Japan.
3-250069 of 0000 Japan.
58-80368 of 0000 Japan.
6-192610 of 0000 Japan.
6-299114 of 0000 Japan.
6-313142 of 0000 Japan.
60-186573 of 0000 Japan.
62-37678 of 0000 Japan.
63-95277 of 0000 Japan.
64-8673 of 0000 Japan.
7-118592 of 0000 Japan.
7-145339 of 0000 Japan.
7-17872 of 0000 Japan.
7-228797 of 0000 Japan.
7-70468 of 0000 Japan.
8-151547 of 0000 Japan.
8-209053 of 0000 Japan.
9-176551 of 0000 Japan.

*Primary Examiner*—Helene Klemanski
*Attorney, Agent, or Firm*—Darby & Darby

[57] ABSTRACT

Provided is a water based ink having a metallic lustrous color for a ballpoint pen in which a metal powder pigment or aluminum powder and a complementary colorant (pigment or a colored water-insoluble polymer fine particles) are used as a colorant and further in addition to a thickener, a polar solvent and water, particularly a resin emulsion is used in combination to reduce the use amount of the thickener to thereby lower the viscosity. The ink is improved in follow-up property to be able to write continuously, develops a metallic color of a rainbow color on writing paper having a dark color and provides lines having water resistance and weatherability. The ink does not allow the metal powder and the pigment to settle and separate though the viscosity is low.

15 Claims, No Drawings

WATER-BASE INK HAVING METALLIC LUSTROUS COLOR FOR BALLPOINT PEN

TECHNICAL FIELD

The present invention relates to a water based ink having a metallic lustrous color for a ballpoint pen in which a metal powder pigment as a colorant and a complementary colorant are used and which can provide drawn lines of a metallic color tone such as gold and silver regardless of a color tone of writing paper, more specifically to a water based ink having a metallic lustrous color for a ballpoint pen which inhibits the metal powder from settling even in storing for a long time and which has a good follow-up property and can write continuously.

BACKGROUND ART

Aluminum powder, bronze powder and pearl pigments have so far been used as pigments for obtaining drawn lines of a metallic color tone having metallic luster such as gold and silver.

Since bronze powder has a large specific gravity and is susceptible to oxidative discoloration, the addition of the powder having a particle diameter of about several $\mu$m which is required for providing the drawn lines with a metallic lustrous tone is liable to cause problems such as separation by settling, discoloration of the color tone and clogging at the pen tip, and it is very difficult to use the bronze powder for a water based ink for writing instruments.

Aluminum powder has a smaller specific gravity and a less discoloring property as compared with those of bronze powder. However, it has a larger specific gravity as compared with those of conventional pigments and has a defect of oxidative discoloration in a high pH area or a low pH area and a problem that the lines drawn on writing paper having a dark color develops only a silver color.

A pearl pigment comprises mica coated on the surface thereof with titanium oxide and is characterized by that it can provide a metallic lustrous property and a tint of a rainbow color depending on a difference in a refractive index originating in the thickness of the titanium oxide layer.

However, in order to obtain metallic luster close to that of metal powder, a particle diameter of $30\mu$ or more is required, and the addition thereof to an ink has caused problems such as separation by settling, clogging at the pen tip and an increase in writing-resistance.

Inks for marking pens using aluminum powder as a metal powder pigment include inks described in Japanese Patent Publication No. Sho 62-37678 and Japanese Patent Publication No. Hei 1-56109. Disclosed in Japanese Patent Publication No. Sho 62-37678 is a double coloring ink composition which comprises a metal powder pigment such as aluminum powder, an oil-soluble dye, a resin and a solvent and in which the dye is penetrated and diffused into the circumference of the drawn lines formed from the metal powder pigment to produce an outline effect.

Disclosed in Japanese Patent Publication No. Hei 1-56109 is a metallic lustrous ink for a marking pen which comprises fine metal powder such as aluminum powder subjected to surface treatment, a resin and a solvent and which has a good ink follow-up property and does not produce a hard cake by the settling of the metal powder pigment in the ink reservoir of the pen barrel.

The ink for a marking pen described above has a problem that since it has a low viscosity and can not inhibit the aluminum powder from settling and separating, a stirring member such as a metal ball is put in the ink reservoir together with the ink, and this marking pen has to be shaken before writing to disperse once again the settled metal powder pigment, otherwise the good ink follow-up property can not be obtained.

Proposed as well are inks for a ballpoint pen which do not use a stirring member such as a metal ball unlike the ink for a marking pen described above.

Disclosed in Japanese Patent Application Laid-Open No. Sho 60-186573 is an ink which is characterized by containing a solvent, a thickening resin soluble in this solvent, a metal powder pigment and a color pigment at least in each prescribed amount and having a viscosity of a prescribed value or more and which has a metallic color and less precipitation of the pigment because of a high viscosity and is suitable for use in a pressurized ballpoint pen.

Further, disclosed in Japanese Patent Application Laid-Open No. Hei 1-210478 is a water based metallic lustrous ink which is characterized by adding an acetyl alcohol derivative as an additive to a primary ink comprising a resin, an aluminum paste and water and which prevents stain caused by pin hole in applying.

These conventional techniques have problems on separation by settling, an ink follow-up property and long term stability for water based inks for ballpoint pens capable of writing under an atmospheric pressure.

Provided in Japanese Patent Application Laid-Open No. Hei 7-118592 is a water based metallic lustrous ink for a ballpoint pen which is provided with a viscosity of 10,000 to 15,000 cps by a pearl pigment and a thickener comprising seed polysaccharides. However, it has such problems that the ink follow-up property is reduced because of the high viscosity and the writing-resistance is increased since the particle diameter required for providing the metallic luster is too large. Accordingly, it is not satisfactory.

Provided in Japanese Patent Application Laid-Open No. Hei 7-145339 is an ink which comprises aluminum powder, natural polysaccharides for thickening, a water-soluble organic solvent and water and in which the viscosity is 100 to 1,500 poise and a ratio of the viscosity at 1 rpm to the viscosity at 10 rpm is 3.0 or more. However, a problem on the inferior ink follow-up property because of the high viscosity still remains unsolved, and since a water-soluble dye is used for complementing a gold color, a dyeing property of the dye is not sufficient when written on writing paper having a dark color, so that only the silver color drawn lines can be obtained. Further, the lines drawn on writing paper having a pale color have a problem that they are inferior in water resistance and weatherability, so that the drawn lines are discolored. Accordingly, it is not satisfactory.

Provided in Japanese Patent Application Laid-Open No. Hei 6-313142 is a water based metallic lustrous ink comprising aluminum powder, a water-soluble dye, a resin and an inorganic salt, but it has problems on a coloring property on writing paper having a dark color, discoloration of the aluminum powder by oxidation and production of hydrogen and therefore is not satisfactory as well.

A subject of the present invention is to provide a water based ink having a metallic lustrous color for a ballpoint pen which can provide drawn lines having various metallic colors of a rainbow color tone and has improved water resistance and weatherability and a good follow-up property and which can write continuously and is capable of being stored over a long period of time.

DISCLOSURE OF THE INVENTION

The present invention provides a water based ink for a ballpoint pen in which a metal powder pigment or aluminum powder as a colorant and a complementary colorant are used and which is composed of a thickener for preventing the metal powder from settling and separating, a polar solvent, water and other controlling agents required for the water based ink for a ballpoint pen and has preferred metallic lustrous color with a resin emulsion blended. Specific embodiments include:

(1) used as a colorant is metal powder which is colored by coating the surface thereof with a pigment thin film or metal powder whose colored surface is further coated with a synthetic resin, and a resin emulsion may be blended;

(2) used are aluminum powder as a colorant and inorganic and organic colorants as complementary colorants, and a resin emulsion is used in combination; and (3) aluminum powder and a colorant obtained by dyeing fine particles of a water-insoluble polymer with a water-soluble dye are used as colorants, and in this case, a resin emulsion is not necessary.

A thickener used for the inks in the respective embodiments described above is selected from natural polysaccharides, cellulose and synthetic polymers and is blended in a proportion of 0.1 to 1.5% by weight based on the weight of the ink. The ink viscosity is controlled to 500 mPa's or more and less than 8,000 mPa's. When a resin emulsion is used, a resin emulsion and/or a hollow resin emulsion each resin of which has a particle diameter of 200 nm or more are used in a proportion of 2.0 to 10.0% by weight based on the weight of the ink in terms of the weight of the resin particles themselves.

BEST MODE FOR CARRYING OUT THE INVENTION

The embodiment of the present invention shall be explained in detail.

The colored metal powder pigment used in the first embodiment is prepared by adsorbing or coating a color pigment on the surface of metal powder making use of a chemical adsorption method or a vacuum deposition method. It is clear and excellent in luster such that conventional metal powders have never been so, and can provide a polychromatic color.

Further, metal powder which is coated with a synthetic resin after adsorbing the color pigment thereon is more preferred since it can have strong resistance against corrosive chemicals such as acids and others.

The use amount of the colored metal powder pigment is preferably 4 to 15% by weight based on a whole amount of the ink. If the use amount is less than 4% by weight, the drawn lines have a low metallic lustrous property, and if the use amount exceeds 12% by weight, the solid content increases, and the viscosity of the ink is liable to go up. Further, the fluidity is reduced, and the follow-up property of the ink is deteriorated, so that inferior writing tends to be likely to take place.

The particles of the colored metal powder pigment have preferably an average particle diameter of 10 to 40 μm. The average particle diameter of less than 10 μm reduces the metallic lustrous property of the drawn lines to provide the indistinct drawn lines. The larger average particle diameter produces problems such as separation of the particles themselves by settling, clogging at the pen tip part and an increase in the writing-resistance.

Commercially available colored metal powder pigments include Elgy of a vacuum deposition type (manufactured by Oike Ind. Co., Ltd.) and Friend Color of a chemical adsorption type (manufactured by Showa Aluminum Powder Co., Ltd.).

The thickener is used for inhibiting the colored metal powder pigment from settling and providing suitable fluidity for an ink for a ballpoint pen, and the thickeners having a property that the effect thereof is not reduced when they are used in combination with a colored metal powder pigment and a resin emulsion in a water based ink have to be selected.

The addition amount of the thickener is 0.1 to 1.5% by weight. The small addition amount of the thickener is liable to cause settling of the colored metal powder pigment, and the amount as much as exceeding 1.5% by weight reduces the fluidity of the ink, so that inferior writing tends to be likely to take place due to the inferior follow-up property of the ink.

The fluidity can be judged by a viscosity of the ink, and the viscosity value at 1 rpm has to be 1,000 mPa's or more in terms of a value determined by means of an E type viscometer which is a conventional rotational viscometer for inhibiting the colored metal powder pigment from settling. In order to provide this viscosity, the foregoing amount of the thickener has to be added.

Further, if the viscosity value shows 8,000 mPa's or more, the fluidity of the ink is reduced, and the follow-up property of the ink and the feeding of the ink from the pen tip of the ballpoint pen to a writing paper are deteriorated. Accordingly, the addition amount of the thickener has to be controlled.

The polar solvent is used in various qualities for a water based ink for a ballpoint pen, for example, the purposes of preventing dry-up of the ink at the pen tip and freezing of the ink at a low temperature. To be specific, a desired water content is 5% or more, preferably 40% or more in terms of a weight percent based on a whole ink composition. Further, water-soluble organic solvents having hygroscopicity such as ethylene glycol, diethylene glycol, propylene glycol, polyethylene glycol, polypropylene glycol, thiodiglycol, glycerin, diglycerin, 2-pyrrolidone, N-methyl-2-pyrrolidone, dimethylformamide and dimethylimidazolidinone are used preferably alone or in combination of plural kinds thereof.

The resin emulsion is effective for improving the line coloring property of the ink on writing paper having a dark color and inhibiting the colored metal powder pigment from settling and separating.

The resin particles dispersed in water and a water base solvent, if they have an average particle diameter of 200 nm or more, are characterized by showing a white color owing to effects of reflection and refraction of light, and the larger the particle diameter is, the larger the reflection effect is and the larger the white color-covering property grows.

A hollow resin emulsion in which the refraction effect can be expected to grow large can be expected to have more white color-covering property, and the excellent line coloring property of the ink is observed.

The presence of the emulsion of a resin having a large particle diameter among the particles of the colored metal powder pigment having a large particle diameter can inhibit the particles of the colored metal powder pigment from adsorbing and coagulating among them and can inhibit the particles from growing large, and hence the settling-prevention effect can be produced.

In the second embodiment of the present invention, aluminum powder is used as a pigment for providing the drawn lines with a metallic lustrous color.

The flaky aluminum has a high diffusion coefficient, and can provide the metallic lustrous property more clearly. Accordingly, it is particularly preferred. Aluminum powder is obtained by a stamp method in which aluminum pieces are pulverized together with an anti-friction agent such as stearic acid by means of a stamp mill or a ball mill method in which aluminum powder obtained by an injection method and a lubricant are put in a drum together with suitable steel balls and the drum is rotated to pulverize the aluminum pieces.

Usually, the commercially available product can be obtained in the form of an aluminum paste.

An aluminum paste is obtained by pulverizing and abrading aluminum powder in a ball mill containing a petroleum base solvent (mineral spirit) having a high boiling point and an anti-friction agent such as fatty acid and turning into surface-treated very thin flaky aluminum fine powder, and therefore it has less risk of ignition and explosion and good storage stability and is easy to handle in use.

The use amount of the aluminum powder is preferably 4 to 12% by weight based on a whole amount of the ink. The use amount of less than 4% by weight reduces the metallic lustrous property of the drawn lines. In contrast with this, the use amount exceeding 12% by weight increases the solid content and is liable to raise the viscosity and reduce the fluidity of the ink, so that the follow-up property of the ink is deteriorated, and inferior writing tends to be likely to take place.

The aluminum powder has preferably an average particle diameter of 5 to 25 μm. The average particle diameter of less than 5 μm reduces the metallic lustrous property of the drawn lines to make the drawn lines indistinct. The larger average particle diameter causes problems such as separation of the particles themselves by settling, clogging at the pen tip and an increase in the writing-resistance.

A pigment is used as a complementary colorant for the ink of the present embodiment.

The complementary colorant is used for toning and developing a color other than a silver color which is a the ground color of aluminum particles. The pigment itself is excellent in water resistance and weatherability and can provide semi-permanent drawn lines. Further, if it is present together with the resin emulsion, the drawn lines can provide a rainbow color having various color tones regardless of the intensity and the tone of the ground color of writing paper.

Examples of the pigments to be used include inorganic pigments such as carbon black, titanium white, titanium black, zinc oxide, red iron oxide, chromium oxide, black iron oxide, cobalt blue, alumina white, iron oxide yellow, viridian, zinc sulfide, lithopone, cadmium yellow, vermilion, cadmium red, chrome yellow, molybdate orange, zinc chromate, strontium chromate, white carbon, clay, talc, ultramarine, precipitated barium sulfate, baryte powder, calcium carbonate, white lead, Prussian blue, manganese violet, aluminum powder and bronze powder, and organic pigments such as C. I. Pigment Yellow 1, C. I. Pigment Yellow 3, C. I. Pigment Yellow 12, C. I. Pigment Yellow 13, C. I. Pigment Yellow 14, C. I. Pigment Yellow 17, C. I. Pigment Yellow 34, C. I. Pigment Yellow 55, C. I. Pigment Yellow 74, C. I. Pigment Yellow 83, C. I. Pigment Yellow 95, C. I. Pigment Yellow 166, C. I. Pigment Yellow 167, C. I. Pigment Red 5, C. I. Pigment Red 22, C. I. Pigment Red 38, C. I. Pigment Red 48, C. I. Pigment Red 49, C. I. Pigment Red 53, C. I. Pigment Red 57, C. I. Pigment Red 81, C. I. Pigment Red 104, C. I. Pigment Red 146, C. I. Pigment Red 245, C. I. Pigment Blue 1, C. I. Pigment Blue 15, C. I. Pigment Blue 27, C. I. Pigment Violet 1, C. I. Pigment Violet 3, C. I. Pigment Violet 19, C. I. Pigment Violet 23, C. I. Pigment Violet 50, C. I. Pigment Orange 5, C. I. Pigment Orange 13, C. I. Pigment Orange 16 and C. I. Pigment Green 7. They are used alone or in combination of plural kinds thereof.

The thickener is used for inhibiting the aluminum powder from settling and providing suitable fluidity for an ink for a ballpoint pen, and the thickeners having a property that the effect thereof is not reduced when they are used in combination with aluminum powder, a resin emulsion and a complementary color pigment in a water based ink have to be selected.

The addition amount of the thickener is 0.1 to 1.5% by weight based on a whole ink. The small addition amount of the thickener is liable to cause settling of the aluminum powder particles, and the amount as much as exceeding 1.5% by weight reduces the fluidity of the ink, so that inferior writing tends to be likely to take place due to the inferior follow-up property of the ink.

The fluidity can be judged by a viscosity of the ink, and the viscosity value at 1 rpm has to be 500 mPa's or more in terms of a value determined by means of an E type viscometer which is a conventional rotational viscometer for inhibiting the aluminum powder from settling. In order to provide this viscosity, the foregoing amount of the thickener has to be added.

Further, if the viscosity value shows 8,000 mPa's or more, the fluidity of the ink is reduced, and the follow-up property of the ink and the feeding of the ink from the pent tip of the ballpoint pen to writing paper are deteriorated. Accordingly, the addition amount of the thickener has to be controlled.

The polar solvent is used in various qualities for a water based ink for a ballpoint pen, for example, the purposes of preventing dry-up of the ink at the pen tip and freezing of the ink at a low temperature.

To be specific, a desired water content is 5% or more, preferably 40% or more in terms of a weight percent based on a whole ink composition. Further, water-soluble organic solvents having hygroscopicity such as ethylene glycol, diethylene glycol, propylene glycol, polyethylene glycol, polypropylene glycol, thiodiglycol, glycerin, diglycerin, 2-pyrrolidone, N-methyl-2-pyrrolidone, dimethylformamide and dimethylimidazolidinone are used preferably alone or in combination of plural kinds thereof.

The resin emulsion is required for improving the line coloring property of the ink on writing paper having a dark color and inhibiting the aluminum powder from settling and separating.

The resin particles dispersed in water and a water base solvent, if they have an average particle diameter of 200 nm or more, are characterized by showing a white color owing to effects of reflection and refraction of light, and the larger the particle diameter is, the larger the reflection effect is and the larger the white color-covering property grows.

A hollow resin emulsion in which the refraction effect can be expected to grow large can be expected to have more white color-covering property, and the excellent line coloring property of the ink is observed.

The presence of the emulsion of a resin having a large particle diameter among the particles of the aluminum powder having a large particle diameter can inhibit the particles of the aluminum powder from adsorbing and coagulating among them and can inhibit the particles from growing large, and hence the settling-prevention effect can be produced.

The third embodiment of the present invention is an ink having a metallic lustrous color containing a colorant obtained by dyeing water-insoluble polymer fine particles with a water-soluble dye and aluminum powder.

The aluminum powder used for the ink of the present embodiment has an average particle diameter falling in a range of 1 to 50 μm. A larger diameter makes the ink instable with the lapse of time to cause separation and is liable to bring about coagulation. On the other hand, a smaller diameter causes the metallic lustrous property to be short and makes the color tone dull, so that such diameters are not suitable. The diameter is preferably 5 to 30 μm.

The average particle diameter of less than 5 μm reduces the metallic lustrous property of the drawn lines to make the drawn lines indistinct. If the average particle diameter is as large as over 30 μm, particularly over 50 μm, caused are problems such as separation of the particles themselves by settling, clogging at the pen tip and an increase in the writing-resistance.

The use amount of the aluminum powder is preferably 4 to 12% by weight based on a whole amount of the ink.

The use amount of 4% by weight or less reduces the metallic lustrous property of the drawn lines, and the use amount exceeding 12% by weight is liable to raise the viscosity and reduces the fluidity of the ink, so that the follow-up property of the ink is deteriorated, and inferior writing tends to be likely to take place.

Commercially available aluminum paste can be used for the aluminum powder.

The colorant obtained by dyeing water-insoluble polymer fine particles with a water-soluble dye has an average particle diameter falling in a range of 0.1 to 1.0 μm.

When conventional pigments are used as the colorant in the present water based ink, the amount of the solid contained in the ink is small, and the colorant settles down and separates, so that the ink is lacking in stability.

When conventional dyes (acid dyes, basic dyes and direct dyes) are used, the drawn lines are inferior in weatherability and water resistance. Further, they have a defect that when written on writing paper having a dark color, the coloring property of the dye is lost, and only the silver color of aluminum is shown. Accordingly, they are not suitable. Also when the water-insoluble polymer fine particles are used, the consistency of the visual hue of the ink with the hue of the drawn lines is deteriorated when the average particle diameter is small, and if a difference between the hues is large, the ink becomes instable with the lapse of time, and phase separation is liable to take place. Accordingly, such a diameter is not suitable. The average particle diameter is preferably 0.2 to 0.6 μm.

The present water based ink is prevented from separation and color parting by controlling the sum of the water-insoluble polymer fine particles as a colorant and the aluminum powder to 5 to 60% by weight. If the sum is less than this range, separation and color parting take place, and if it exceeds this range, coagulation is caused. Accordingly, both are not suitable.

The sum is preferably 15 to 45% by weight, more preferably 20 to 35% by weight.

Water is used as a principal solvent for the present water based ink, and all solvents which have polar groups and are miscible with water can be used as the polar solvent. There can be used, for example, ethylene glycol, diethylene glycol, triethylene glycol, polyethylene glycol, propylene glycol, ethylene glycol monomethyl ether, glycerin, pyrrolidone and triethanolamine.

The use amount thereof is 5 to 50% by weight, preferably 10 to 30% by weight based on the composition.

The addition of the thickener to the present water based ink provides an ink having more dispersion stability.

The use amount of the thickener falls preferably in a range of 0.1 to 1.5% by weight based on a whole ink.

The small addition amount of the thickener is liable to cause settling of the aluminum powder particles, and the amount as much as exceeding 1.5% by weight reduces the fluidity of the ink, so that inferior writing tends to be likely to take place due to the inferior follow-up property of the ink.

The fluidity can be judged by a viscosity of the ink, and the viscosity value at 1 rpm has to be 500 mPa's or more in terms of a value determined by means of an E type viscometer which is a conventional rotational viscometer for inhibiting the aluminum powder from settling. In order to provide this viscosity, the foregoing amount of the thickener has to be added.

Further, if the viscosity value shows 6,000 mPa's or more, the fluidity of the ink is reduced, and the follow-up property of the ink is deteriorated. Accordingly, the addition amount of the thickener has to be controlled.

Next, the components used in the respective embodiments of the present invention shall be explained.

The commercially available aluminum pastes which are suited to the present invention include brand names Super Fine No. 22000WN and Super Fine No. 18000 manufactured by Daiwa Metal Ind. Co., Ltd.; brand names WB0230 and WB1200 manufactured by Toyo Aluminum K.K.; brand name SAP-1110-W manufactured by Showa Denko K.K.; brand name STAPAHYDROLAC-300-SUPER manufactured by Eckart Co., Ltd.; and brand name AW-808C manufactured by Asahi Chemical Industry Co., Ltd.

The aluminum powder includes brand names AA12, No. 900 and No. 18000 manufactured by Fukuda Metal Foil Ind. Co., Ltd.

The thickener used in the present invention includes, to be specific, natural polysaccharides, i.e. seed polysaccharides such as guar gum, locust bean gum, galactomannan, pectin and derivatives thereof, psyllium seed gum and tamarind gum; biological base gums such as xanthan gum, rheozan gum, rhamsan gum, welan gum and gellan gum; sea weed polysaccharides such as carrageenan, alginic acid and derivatives thereof; resin polysaccharides such as trangacanth gum; cellulose and derivatives thereof such as ethyl cellulose, methyl cellulose, hydroxymethyl cellulose and carboxymethyl cellulose; and synthetic polymers such as polyacrylic acid and cross-linking type copolymers thereof, polyvinyl alcohol, polyethylene oxide, polyvinylpyrrolidone and derivatives thereof, polyvinyl methyl ether and derivatives thereof, and polyacrylamide.

In particular, the biological base gums are characterized by a strong viscosity-providing effect and physical properties which are stable even after storage over a long period of time but tend to have strong properties for propagating miscellaneous fungi and coagulating fine powder pigments.

Polyacrylic acid and cross-linking type copolymers thereof are characterized by stability against coagulation of fine powder pigments and propagation of miscellaneous fungi but tend to be inferior in a viscosity-providing property to natural polysaccharides.

At least one thickener selected from the thickeners described above can be used depending on the addition amounts and the kinds of the colored metal powder pigment, the aluminum powder and the complementary colorant of the ink components.

For example, if the aluminum powder is eluted in water in the form of ions by virtue of trace amounts of electrolytes contained in the ink, the water-soluble resins used for dispersing and stabilizing the pigment and for the thickener are gelatinized, hydrolyzed or partially insolubilized by the action of the aluminum ions, so that the ink tends to increase in viscosity or separate and coagulate.

The thickeners having functional groups capable of inactivating the eluted aluminum ion by an ionic bond, for example, xanthan gum and rheozan gum having glucuronic acid on side chains, cationized derivatives of guar gum and locust bean gum, and polyacrylic acid having carboxylic acid can maintain a long term storage stability in a water based ink containing aluminum powder and tend to be liable to prevent deterioration of the ink.

The use amount of the thickener is preferably 0.1 to 1.5% by weight. The use amount is varied depending on the kind of the thickener. It is preferably 0.1 to 0.8% by weight in natural polysaccharides and preferably 0.5 to 1.5% by weight in synthetic polymers.

Examples of the resin emulsion include brand names Acronal YJ-1556D and Acronal S-400 manufactured by Mitsubishi Chemicals Corporation; brand names Voncoat AB-735 and AN-865 manufactured by Dainippon Ink and Chemicals Inc.; brand names Microgel E-3101 and Microgel MPE-13 manufactured by Nippon Paint Co., Ltd.; and brand names STADEX-SC-041-S and STADEX-SC-051-S manufactured by Japan Synthetic Rubber Co., Ltd.

The hollow resin emulsion includes brand names Ropaque OP-62 and Ropaque OP-84J manufactured by Rohm & Haas Co., Ltd.; and a brand name Nipol MH-505 manufactured by Nippon Zeon Co., Ltd.

The addition amount of the resin emulsion is preferably 2.0 to 10.0% by weight in terms of the weight of the resin particles themselves. The use amount of less than 2.0% by weight can not cover the ground color of writing paper having a dark color and does not provide a good coloring property of a metallic tone rainbow color, so that the drawn lines assume an aluminum color or the metal particles can not be inhibited from coagulating and tend to settle down.

Further, the use amount exceeding 10% by weight intensifies the interaction with the thickener to reduce the fluidity of the ink in spite of a small viscosity value and tends to deteriorate the writing property. Accordingly, the use amount is preferably 2.0 to 10.0% by weight in terms of the weight of the resin particles themselves.

Added, if necessary, as other adjusting agents are pH adjusting agents such as ammonia, urea, monoethanolamine, diethanolamine, triethanolamine, alkaline metal salts of carbonic acid and phosphoric acid such as sodium tripolyphosphate and sodium carbonate, and hydroxides of alkaline metals such as sodium hydroxide; preservatives or fungicides such as phenol, sodium omadine, sodium pentachlorophenol, 1,2-benzisothiazoline-3-one, 2,3,5,6-tetrachloro-4-(methylsulfonyl)pyridine, alkaline metal salts of benzoic acid, sorbic acid and dehydroacetic acid such as sodium benzoate, and benzimidazole base compounds; rust preventives such as benzotriazole, dicyclohexylammonium nitrite, diisopropylammonium nitrite and tolyltriazole; surfactants such as derivatives of polyoxyethylene, polyoxypropylene or polyoxyethylenepolyoxypropylene such as polyoxyethylene lauryl ether, derivatives of glycerin, diglycerin or polyglycerin such as tetraglycerin distearate, sorbitan derivatives such as sorbitan monooleate, fatty acid alkali salts, nonionic surfactants, and compounds having fluorinated alkyl groups such as perfluoroalkylphosphoric acid esters; and lubricants and wetting agents such as polyether-modified silicone including polyethylene glycol adducts of dimethylpolysiloxane.

These surfactants given as examples of lubricants and wetting agents have a function to disperse and stabilize a pigment, aluminum powder and metal powder pigment particles, but preferably used as dispersants are anionic surfactants such as alkyl sulfonic acid salts of higher fatty acid amide and alkylarylsulfonic acid salts, and water-soluble polymers such as polyvinylpyrrolidone, polyvinyl alcohol, polyacrylic acid, polyacrylic acid copolymers, acrylic-methacrylic acid base resins, styrene-acryl base resins, maleic acid resins and styrene-maleic acid base resins.

Various methods for producing inks which have so far been known can be employed for producing the water based ink having a material lustrous color for a ballpoint pen of the present invention.

It can readily be obtained by, for example, blending the respective components described above and mixing and stirring them by means of a stirrer such as a dissolver or mixing and crushing them by means of a ball mill or three rolls and then removing coarse particles, undissolved materials and admixed solid substances out of the pigment particles and aluminum powder particles by centrifugation and filtration.

The present invention shall more specifically be explained below with reference to examples, but the present invention shall not be restricted to these examples.

The inks obtained in the following examples and comparative examples were tested by the following testing methods.

(1) Measurement of average particle diameter ($\mu$m)

The average particle diameter ($\mu$m) was determined by means of NICOMP 370 (manufactured by Nozaki & Co., Ltd., particle diameter measuring apparatus) using a photon correlation method within a week after preparing the inks.

(2) Measurement of average particle diameter ($\mu$m) with lapse of time

After leaving standing at room temperature for six months after preparing the inks, the particle diameter was determined by the same method as that in (1).

(3) Measurement of viscosity value

The viscosity value at 1 rpm was determined at 25° C. by means of an EMD type viscometer (manufactured by Toki Sangyo Co., Ltd.) within a week after preparing the inks.

(4) Measurement of viscosity value with lapse of time

After leaving standing at room temperature for six months after preparing the inks, the viscosity value at 1 rpm was determined by the same method as that in (3).

(5) Coloring property of ink

The ink was filled into a refill comprising a polypropylene-made ink reservoir having a inner diameter of 3.5 mm and a length of 100 mm and having no feed, and a stainless steel-made pen tip having a ball diameter of 0.7 mm to prepare a ballpoint pen for evaluation.

This ballpoint pen for evaluation was used to write on a Xerox M paper (absorbent paper), a black coat paper (non-absorbent paper) and a black drawing paper (absorbent paper: New Color No. 418 manufactured by Shikoku Paper Co., Ltd.) respectively to observe the coloring property of the drawn lines thereof with eyes.

The evaluation criteria is based on the following 5 grade evaluation:

◯: coloring of colored metallic color
●: coloring of a little colored metallic color with a large reduction in coloring
Δ: coloring of metallic color with partial marked silver color
▲: coloring of almost only silver color
X: coloring of only metallic silver color (6) Follow-up property of ink A ballpoint pen for tests was used for quickly writing spirals with a hand, and the presence of starving and splitting in the resulting lines was observed with eyes:
◉: not present at all
◯: slightly present
Δ: a little present
X: present very much (7) Metallic lustrous property of ink The ink was applied on writing paper in a fixed film thickness at room temperature, and the metallic lustrous property of the ink was evaluated according to the following criteria:
◯: distinct metallic lustrous property observed
Δ: a little inferior in metallic lustrous property
X: no metallic lustrous property observed (8) Stability of ink with lapse of time The ink put in a glass sample bottle in a tightly sealed state was left standing under a condition of 50° C. for a month to observe a phase separation of the aluminum powder part of the ink from the other parts, and this was evaluated in terms of a stability of the ink with lapse of time according to the following criteria:
◯: little difference from initial stage observed
Δ: a little phase separation observed but usable
X: phase separation produced to such an extent as unusable

EXAMPLE 1

| | |
|---|---|
| Friend Color (F350RG manufactured by Showa Aluminum Powder Co., Ltd.: colored metallic powder pigment content 40% by weight) | 10.0 parts by weight |
| Propylene glycol | 20.0 parts by weight |
| Xanthan gum | 0.5 parts by weight |
| Potassium oleate | 0.5 parts by weight |
| Purified water | 69.0 parts by weight |

The compounds described above were filtered after stirring to thereby obtain a water based ink for a ballpoint pen.

EXAMPLE 2

| | |
|---|---|
| Friend Color (F350RG manufactured by Showa Aluminum Powder Co., Ltd.: colored metallic powder pigment content 40% by weight) | 7.0 parts by weight |
| Propylene glycol | 20.0 parts by weight |
| Xanthan gum | 0.5 parts by weight |
| Potassium oleate | 0.5 parts by weight |
| Hollow resin emulsion (Ropaque OP-84J manufactured by Rohm & Haas Co., Ltd.: resin particle content 42.5 % by weight, average particle diameter 550 nm) | 10.0 parts by weight |
| Purified water | 62.0 parts by weight |

The compounds described above were filtered after stirring to thereby obtain a water based ink for a ballpoint pen.

EXAMPLE 3

| | |
|---|---|
| Friend Color (F350GR manufactured by Showa Aluminum Powder Co., Ltd.: colored metallic powder pigment content 40% by weight) | 10.0 parts by weight |
| Propylene glycol | 20.0 parts by weight |
| Locust bean gum | 0.5 parts by weight |
| Potassium oleate | 0.5 parts by weight |
| Purified water | 69.0 parts by weight |

The compounds described above were filtered after stirring to thereby obtain a water based ink for a ballpoint pen.

EXAMPLE 4

| | |
|---|---|
| Friend Color (F350BL manufactured by Showa Aluminum Powder Co., Ltd.: colored metallic powder pigment content 40% by weight) | 10.0 parts by weight |
| Propylene glycol | 20.0 parts by weight |
| Hiviswako 105 | 0.8 parts by weight |
| Potassium oleate | 0.5 parts by weight |
| Purified water | 68.7 parts by weight |

The compounds described above were filtered after stirring to thereby obtain a water based ink for a ballpoint pen.

Comparative Example 1

A colored metallic powder pigment and a resin emulsion are not used:

| | |
|---|---|
| Aluminum paste (WB0230 manufactured by Toyo Aluminum K.K.: aluminum powder content 68% by weight) | 10.0 parts by weight |
| Propylene glycol | 20.0 parts by weight |
| Xanthan gum | 0.5 parts by weight |
| Potassium oleate | 0.5 parts by weight |
| Purified water | 69.0 parts by weight |

The compounds described above were filtered after stirring to thereby obtain a water based ink.

Comparative Example 2

A pigment is used but a resin emulsion is not blended:

| | |
|---|---|
| Aluminum paste (WB0230 manufactured by Toyo Aluminum K.K.: aluminum powder content 68% by weight) | 8.0 parts by weight |
| Propylene glycol | 20.0 parts by weight |
| Xanthane gum | 0.5 parts by weight |
| Potassium oleate | 0.5 parts by weight |
| Lacqutimine Color (Golden Yellow FL2R Conc. manufactured by Dainichiseika Color & Chemicals MFG. Co., Ltd.) | 15.0 parts by weight |
| Purified water | 56.0 parts by weight |

The compounds described above were filtered after stirring to thereby obtain a water based ink.

Comparative Example 3

| | |
|---|---|
| Aluminum paste (WB0230 manufactured by Toyo Aluminum K.K.: aluminum powder content 68% by weight) | 8.0 parts by weight |
| Propylene glycol | 20.0 parts by weight |
| Xanthan gum | 0.5 parts by weight |
| Potassium oleate | 0.5 parts by weight |
| Lacqutimine Color (Light Green FLK Conc. manufactured by Dainichiseika Color & Chemicals MFG. Co., Ltd.) | 15.0 parts by weight |
| Purified water | 56.0 parts by weight |

The compounds described above were filtered after stirring to thereby obtain a water based ink.

Test results of the inks obtained in Examples 1 to 4 and Comparative Examples 1 to 3 are shown in Table 1 and Table 2.

TABLE 1

| | Average particle diameter ($\mu$m) | | Viscosity value (mPa'a) | |
|---|---|---|---|---|
| | Initial | After 6 months | Initial | After 6 months |
| Example-1 | 35.8 | 40.2 | 1800 | 2200 |
| Example-2 | 30.3 | 32.5 | 1660 | 1800 |
| Example-3 | 37.4 | 40.0 | 2550 | 3210 |
| Example-4 | 36.5 | 42.5 | 1400 | 1600 |
| Comparative Example-1 | 16.0 | 38.5 | 1800 | 3750 |
| Comparative Example-2 | 18.0 | 42.5 | 2450 | 2800 |
| Comparative Example-3 | 19.0 | 45.0 | 2800 | 4230 |

Average particle diameter ($\mu$m) and viscosity value (mPa'a):

It can clearly be found from the results of this table that the inks obtained in the examples have less variation in coagulation of the aluminum powder particles and the thickening property with the lapse of time and are stable.

TABLE 2

| | Ink coloring property | | | Ink follow-up property | |
|---|---|---|---|---|---|
| | Xerox M paper | Black drawing paper | Coat paper | Starving | Splitting |
| Example-1 | ○ | Δ | ○ | ○ | ○ |
| Example-2 | ○ | ○ | ○ | ⊙ | ⊙ |
| Example-3 | ○ | Δ | ○ | ○ | ○ |
| Example-4 | ○ | Δ | ○ | ○ | ⊙ |
| Comparative Example-1 | ▲ | ▲ | ▲ | ○ | Δ |
| Comparative Example-2 | Δ | ▲ | Δ | ○ | Δ |
| Comparative Example-3 | ▲ | ▲ | ▲ | Δ | Δ |

Ink coloring property and ink follow-up property

It can be judged from the results of this table that the inks obtained in the examples are excellent in an ink coloring property and an ink follow-up property as compared with the inks prepared in the comparative examples.

EXAMPLE 5

| | |
|---|---|
| Aluminum paste (WB0230 manufactured by Toyo Aluminum K.K.: aluminum powder content 68% by weight) | 10.0 parts by weight |
| Propylene glycol | 20.0 parts by weight |
| Xanthan gum | 0.5 parts by weight |
| Potassium oleate | 0.5 parts by weight |
| Hollow resin emulsion (Ropaque OP-84J manufactured by Rohm & Haas Co., Ltd.: resin particle content 42.5% by weight, average particle diameter 550 nm) | 10.0 parts by weight |
| Purified water | 59.0 parts by weight |

The compounds described above were filtered after stirring to thereby obtain a silver color water based ink for a ballpoint pen.

EXAMPLE 6

| | |
|---|---|
| Aluminum paste (WB0230 manufactured by Toyo Aluminum K.K.: aluminum powder content 68% by weight) | 8.0 parts by weight |
| Propylene glycol | 20.0 parts by weight |
| Xanthan gum | 0.5 parts by weight |
| Potassium oleate | 0.5 parts by weight |
| Complementary color pigment (Lacqutimine Color Golden Yellow FL2R Conc. manufactured by Dainichiseika Color & Chemicals MFG. Co., Ltd.) | 15.0 parts by weight |
| Hollow resin emulsion (Ropaque OP-84J manufactured by Rohm & Haas Co., Ltd.: resin particle content 42.5% by weight, average particle diameter 550 nm) | 10.0 parts by weight |
| Purified water | 46.0 parts by weight |

The compounds described above were filtered after stirring to thereby obtain a golden color water based ink for a ballpoint pen.

EXAMPLE 7

| | |
|---|---|
| Aluminum paste (WB0230 manufactured by Toyo Aluminum K.K.: aluminum powder content 68% by weight) | 8.0 parts by weight |
| Propylene glycol | 20.0 parts by weight |
| Locust bean gum | 0.5 parts by weight |
| Potassium oleate | 0.5 parts by weight |
| Complementary color pigment (Lacqutimine Color Blue FL2B Conc. manufactured by Dainichiseika Color & Chemicals MFG. Co., Ltd.) | 15.0 parts by weight |
| Hollow resin emulsion (Ropaque OP-84J manufactured by Rohm & Haas Co., Ltd.: resin particle content 42.5% by weight, average particle diameter 550 nm) | 10.0 parts by weight |
| Purified water | 46.0 parts by weight |

The compounds described above were filtered after stirring to thereby obtain a blue metallic color water based ink for a ballpoint pen.

EXAMPLE 8

| | |
|---|---|
| Aluminum paste (WB0230 manufactured by Toyo Aluminum K.K.: aluminum powder content 68% by weight) | 8.0 parts by weight |
| Propylene glycol | 15.0 parts by weight |
| Locust bean gum | 0.5 parts by weight |
| Potassium oleate | 0.5 parts by weight |
| Complementary color pigment (Lacqutimine Color Green FLB Conc. manufactured by Dainichiseika Color & Chemicals MFG. Co., Ltd.) | 15.0 parts by weight |
| Hollow resin emulsion (Ropaque OP-84J manufactured by Rohm & Haas Co., Ltd.: resin particle content 42.5% by weight average particle diameter 550 nm) | 10.0 parts by weight |
| Purified water | 51.0 parts by weight |

The compounds described above were filtered after stirring to thereby obtain a green metallic color water based ink for a ballpoint pen.

Comparative Example 4

A resin emulsion has an average particle diameter of 200 nm or less and the blending amount is larger than 10.0% by weight:

| | |
|---|---|
| Aluminum paste (WB0230 manufactured by Toyo Aluminum K.K.: aluminum powder content 68% by weight) | 8.0 parts by weight |
| Propylene glycol | 20.0 parts by weight |
| Xanthan gum | 0.5 parts by weight |
| Potassium oleate | 0.5 parts by weight |
| Complementary color pigment (Lacqutimine Color Golden Yellow FL2R Conc. manufactured by Dainichiseika Color & Chemicals MFG. Co., Ltd.) | 15.0 parts by weight |
| Hollow resin emulsion (Joncryl J-780 manufactured by Johnson Polymer Co., Ltd.: resin particle content 42% by weight average particle diameter 100 nm) | 15.0 parts by weight |
| Purified water | 41.0 parts by weight |

The compounds described above were filtered after stirring to thereby obtain a water based ink.

Comparative Example 5

A complementary color pigment is not used and a dye is used:

| | |
|---|---|
| Aluminum paste (WB0230 manufactured by Toyo Aluminum K.K.: aluminum powder content 68% by weight) | 8.0 parts by weight |
| Propylene glycol | 20.0 parts by weight |
| Xanthan gum | 0.5 parts by weight |
| Potassium oleate | 0.5 parts by weight |
| Dye (Water Blue 105 manufactured by Orient Chemical Ind. Ltd.) | 5.0 parts by weight |
| Hollow resin emulsion (Ropaque OP-84J manufactured by Rohm & Haas Co., Ltd.: resin particle content 42.5% by weight, average particle diameter 550 nm) | 10.0 parts by weight |
| Purified water | 56.0 parts by weight |

The compounds described above were filtered after stirring to thereby obtain a water based ink.

Comparative Example 6

A complementary color pigment and a resin emulsion are not blended:

| | |
|---|---|
| Aluminum paste (WB0230 manufactured by Toyo Aluminum K.K.: aluminum powder content 68% by weight) | 10.0 parts by weight |
| Propylene glycol | 20.0 parts by weight |
| Xanthan gum | 1.5 parts by weight |
| Potassium oleate | 0.5 parts by weight |
| Purified water | 68.0 parts by weight |

The compounds described above were filtered after stirring to thereby obtain a water based ink.

Test results of the inks obtained in Examples 5 to 8 and Comparative Examples 4 to 6 are shown in Table 3 and Table 4 together with the results obtained in Comparative Examples 1 to 2.

TABLE 3

| | Average particle diameter ($\mu$m) | | Viscosity value (mPa'a) | |
|---|---|---|---|---|
| | Initial | After 6 months | Initial | After 6 months |
| Example-5 | 15.2 | 18.0 | 2800 | 3200 |
| Example-6 | 14.8 | 18.0 | 2300 | 2560 |
| Example-7 | 18.0 | 22.0 | 3050 | 3470 |
| Example-8 | 20.5 | 22.5 | 4400 | 5600 |
| Comparative Example-1 | 16.0 | 38.5 | 1800 | 3750 |
| Comparative Example-2 | 18.0 | 42.5 | 2450 | 2800 |
| Comparative Example-4 | 19.0 | 45.0 | 3800 | 6120 |
| Comparative Example-5 | 21.0 | 55.8 | 1500 | 1750 |
| Comparative Example-6 | 21.0 | 55.8 | 9500 | 16000 |

It is apparent from the results of the table described above that the inks obtained in the examples have less variation in coagulation of the aluminum powder particles and the thickening property with the lapse of time and are stable.

TABLE 4

| | Ink coloring property | | | Ink follow-up property | |
|---|---|---|---|---|---|
| | Xerox M paper | Black drawing paper | Coat paper | Starving | Splitting |
| Example-5 | ▲ | ▲ | ▲ | ⊚ | ⊚ |
| Example-6 | ○ | Δ | ○ | ⊚ | ⊚ |
| Example-7 | ○ | ○ | ○ | ⊚ | ○ |
| Example-8 | ○ | ○ | ○ | ○ | Δ |

TABLE 4-continued

| | Ink coloring property | | | Ink follow-up property | |
|---|---|---|---|---|---|
| | Xerox M paper | Black drawing paper | Coat paper | Starving | Splitting |
| Comparative Example-1 | ▲ | ▲ | ▲ | ○ | Δ |
| Comparative Example-2 | Δ | ▲ | Δ | ○ | Δ |
| Comparative Example-4 | ▲ | ▲ | ▲ | Δ | Δ |
| Comparative Example-5 | ▲ | ▲ | ▲ | ○ | ○ |
| Comparative Example-6 | ○ | Δ | ○ | X | X |

It can be judged from the results of the table described above that the inks obtained in the examples are excellent in an ink coloring property and an ink follow-up property.

EXAMPLE 9

| | |
|---|---|
| Water-insoluble polymer fine particles (Lumikol NKW-2117P manufactured by Nippon Fluorescent Chemical Co., Ltd.) | 40.0 parts by weight |
| Aluminum paste (AW808C manufactured by Asahi Chemical Industry Co., Ltd.) | 5.0 parts by weight |
| Glycerin | 20.0 parts by weight |
| Water | 33.2 parts by weight |
| Benzotriazole | 0.5 part by weight |
| Triethanolamine | 1.0 part by weight |
| Kelzan (thickener: manufactured by Sansho Co., Ltd.) | 0.3 part by weight |

The compounds described above were blended and filtered after stirring at ambient temperature for 2 hours to thereby obtain a pink color ink having a metallic lustrous property.

EXAMPLE 10

| | |
|---|---|
| Water-insoluble polymer fine particles (Lumikol NKW-2103P manufactured by Nippon Fluorescent Chemical Co., Ltd.) | 40.0 parts by weight |
| Aluminum paste (Super Fine No. 22000WN manufactured by Daiwa Metal powder Ind. Co., Ltd.) | 8.0 parts by weight |
| Glycerin | 20.0 parts by weight |
| Water | 30.3 parts by weight |
| Benzotriazole | 0.5 part by weight |
| Triethanolamine | 0.8 part by weight |
| Rheogic 252L (thickener: manufactured by Wako Pure Chemical Industries, Ltd.) | 0.4 part by weight |

The compounds described above were blended and filtered after stirring at ambient temperature for 2 hours to thereby obtain a red ink having a metallic lustrous property.

EXAMPLE 11

| | |
|---|---|
| Water-insoluble polymer fine particles (Lumikol NKW-2104P manufactured by Nippon Fluorescent Chemical Co., Ltd.) | 45.0 parts by weight |
| Aluminum paste (SAP-1110-W manufactured by Showa Denko K.K.) | 5.0 parts by weight |
| Glycerin | 20.0 parts by weight |
| Water | 28.2 parts by weight |
| Benzotriazole | 0.5 part by weight |
| Triethanolamine | 1.0 part by weight |
| Hiviswako #105 (thickener: manufactured by Wako Pure Chemicals Industries, Ltd.) | 0.3 part by weight |

The compounds described above were blended and filtered after stirring at ambient temperature for 2 hours to thereby obtain an orange color ink having a metallic lustrous property.

The inks obtained in Examples 9 to 11 were tested for a metallic lustrous property and stability with the lapse of time. The results thereof are shown in Table 5.

TABLE 5

| | Example | | |
|---|---|---|---|
| | 9 | 10 | 11 |
| Metallic lustrous property of ink | ○ | ○ | ○ |
| Stability with lapse of time | ○ | ○ | Δ |

INDUSTRIAL APPLICABILITY

The water based pigment ink having a metallic lustrous color for a ballpoint pen of the present invention is excellent in a long term storage stability owing to the presence of the colored metallic powder pigment and covers the ground color of writing paper, so that it can provide drawn lines having a metallic lustrous color which is excellent in coloring on any writing paper. It can be used for stamps and printers as well as ballpoint pens.

What is claimed is:

1. A water based ink having a metallic lustrous color for a ballpoint pen comprising at least a metal powder pigment, said metal powder pigment having surfaces wherein color pigment is absorbed or coated on said surfaces, a thickener, water and a polar solvent, wherein the ink has a viscosity of 1,000 mPa's or more and less than 8,000 mPa's.

2. The water based ink having a metallic lustrous color for a ballpoint pen as described in claim 1, wherein said metal powder pigment in which metal powder surfaces are subjected to coloring treatment are coated with a synthetic resin.

3. The water based ink having a metallic lustrous color for a ballpoint pen as described in claim 1, further comprising blending a resin emulsion and/or a hollow resin emulsion each resin of which has a particle diameter of 200 nm or more.

4. The water based ink having a metallic lustrous color for a ballpoint pen as described in claim 1, wherein the blending amount of the thickener is 0.1 to 1.5% by weight.

5. The water based ink having a metallic lustrous color for a ballpoint pen as described in claim 1, wherein the thickener is selected from at least one of the group consisting of xanthan gum and rheozan gum having glucuronic acid on side chains, cationized derivatives of guar gum and locust bean gum, and polyacrylic acid having carboxylic acid.

6. The water based ink having a metallic lustrous color for a ballpoint pen as described in claim 1, wherein the polar solvent is selected from at least one of the group consisting of ethylene glycol, diethylene glycol, propylene glycol, polyethylene glycol, polypropylene glycol, thiodiglycol, glycerin, diglycerin, 2-pyrrolidone, N-methyl-2-pyrrolidone, dimethylformamide and dimethylimidazolidinone.

7. The water based ink having a metallic lustrous color for a ballpoint pen as described in claim 1, wherein water is contained in a proportion of 40% or more in terms of a weight percent based on a whole ink composition.

8. The water based ink having a metallic lustrous color for a ballpoint pen as described in claim 3, wherein the addition amount of the resin emulsion and/or the hollow resin emulsion is 2.0 to 10.0% by weight in terms of the weight of the resin particles themselves.

9. A water based ink having a metallic lustrous color for a ballpoint pen which comprises a colorant comprising water-insoluble polymer fine particles dyed with a water soluble dye, aluminum powder and a thickener and which is dispersed in a polar solvent, wherein the ink has a viscosity of 500 mPa's or more and less than 6,000 mPa's.

10. The water based ink having a metallic lustrous color for a ballpoint pen as described in claim 9, wherein the colorant has an average particle diameter falling in a range of 0.1 to 1.0 $\mu$m.

11. The water based ink having a metallic lustrous color for a ballpoint pen as described in claim 9, wherein the aluminum powder has an average particle diameter falling in a range of 5 to 30 $\mu$m.

12. The water based ink having a metallic lustrous color for a ballpoint pen as described in claim 9, wherein the sum of content of the colorant and the aluminum powder accounts for 5 to 60% by weight.

13. The water based ink having a metallic lustrous color for a ballpoint pen as described in claim 9, wherein the blending amount of the thickener is 0.1 to 1.5% by weight.

14. The water based ink having a metallic lustrous color for a ballpoint pen as described in claim 9, wherein the thickener is selected from at least one of the group consisting of xanthan gum and rheozan gum having glucuronic acid on side chains, cationized derivatives of guar gum and locust bean gum, and polyacrylic acid having carboxylic acid.

15. The water based ink having a metallic lustrous color for a ballpoint pen as described in claim 9, wherein the polar solvent is selected from at least one of the group consisting of ethylene glycol, diethylene glycol, propylene glycol, polyethylene glycol, polypropylene glycol, thiodiglycol, glycerin, diglycerin, 2-pyrrolidone, N-methyl-2-pyrrolidone, dimethylformamide and dimethylimidazolidinone.

* * * * *